3,447,564
LEAKPROOF VALVE
Irving W. North, Neenah, and William L. Woodfill, Oshkosh, Wis., assignors to Brunswick Corporation, Chicago, Ill., a corporation of Delaware
Filed May 31, 1967, Ser. No. 642,531
Int. Cl. F16k 15/04, 15/14
U.S. Cl. 137—512                    8 Claims

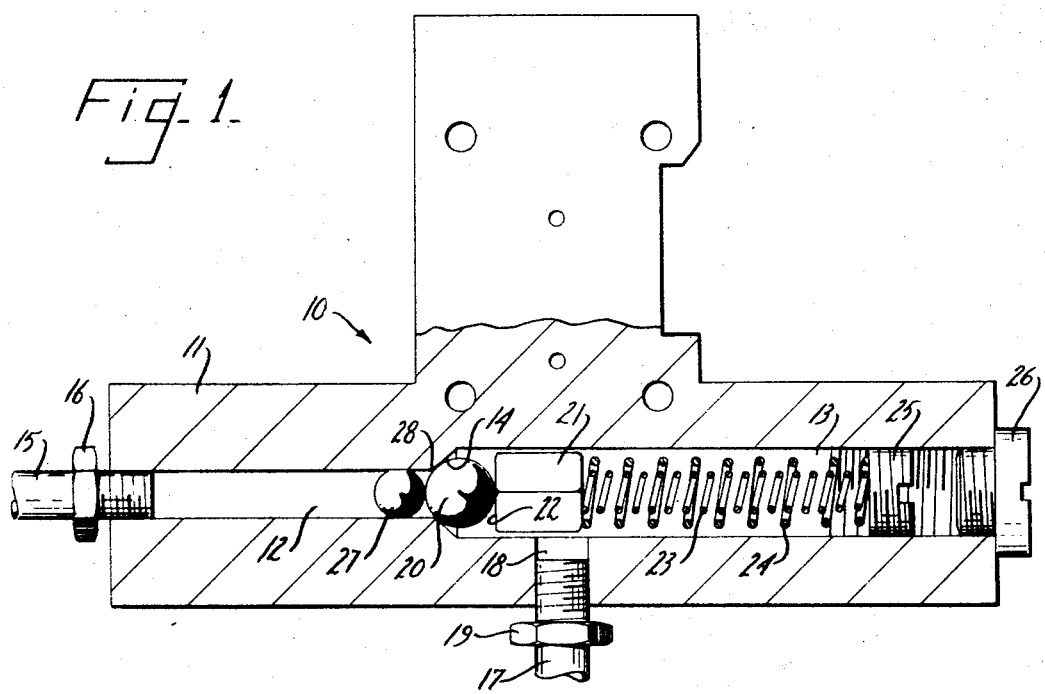
Fig. 1.
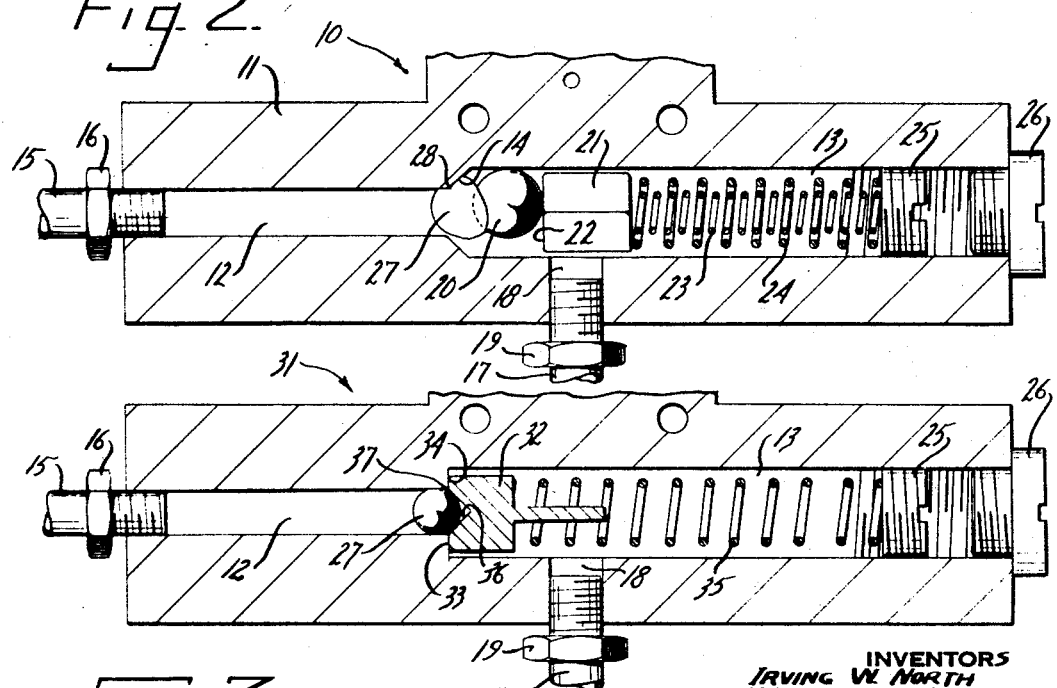
Fig. 2.
Fig. 3.
INVENTORS
IRVING W. NORTH
WILLIAM L. WOODFILL
BY
Andrus & Starke
Attorneys INVENTORS
IRVING W. NORTH
WILLIAM L. WOODFILL
BY
Andrus & Starke
Attorneys

United States Patent Office 3,447,564
Patented June 3, 1969

ABSTRACT OF THE DISCLOSURE

A slightly oversize, relatively hard resilient ball is disposed in the valve bore ahead of the valve closure member. At pressures of lesser magnitude than the blow-off pressure, the resilient ball is forced against the closure member and deformed to exert a sealing force radially on the bore wall generally commensurate with the inlet pressure to provide a leakproof valve. With a flow through barrier disposed ahead of the resilient ball reverse flow through the valve is checked as the resilient ball is forced against the barrier by the back pressure and deformed to exert a sealing force radially on the bore wall.

---

In conventional spring loaded ball regulator or relief valves, leakage becomes a problem as the seat becomes worn or deformed or if foreign matter is deposited or entrapped on the seat. Such valves also are subject to variations in relief pressure if the spring is not maintained squarely in alignment with the closure ball. When nearing the critical regulator or relief pressure, the closure ball of such a valve will sometimes float or bounce giving rise to noise, vibration, leakage and/or premature blow-off. It is generally an object of this invention to provide valve sealing means to render a valve substantially leakproof even if the valve closure member is not properly engaged with its seat.

Generally according to the invention, a slightly oversize, relatively hard resilient ball is disposed in the valve bore ahead of the valve closure member. At pressures of lesser magnitude than the blow-off pressure, the resilient ball is forced against the closure member and deformed to exert a sealing force radially on the bore wall generally commensurate with the inlet pressure to provide a leakproof valve. When the inlet bore is so sealed, the condition of the valve closure member and seat become relatively unimportant and the seat becomes a mere stop for the closure member. With a flow through barrier disposed ahead of the resilient ball reverse flow through the valve is checked as the resilient ball is forced against the barrier by the back pressure and deformed to exert a sealing force radially on the bore wall.

The accompanying drawings illustrate the best mode for carrying out the invention as presently contemplated and set forth hereinafter.

In the drawings:

FIGURE 1 is a sectional view of a regulator or poppet relief valve embodying the invention with the valve being shown in closed position;

FIG. 2 is a view generally similar to that of FIG. 1 and shows the valve in an open position;

FIG. 3 is a sectional view of a regulator or poppet relief valve embodying the invention and shows a different form of valve closure means;

Figure 4:
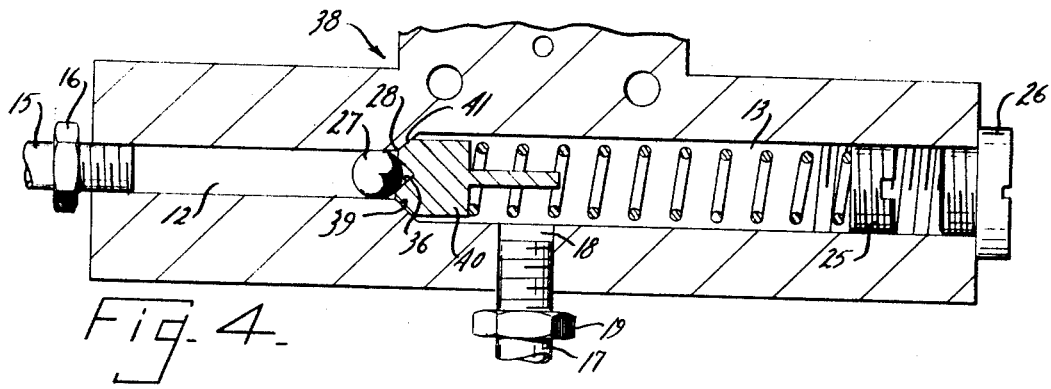
FIG. 4 is a sectional view of a regulator or poppet relief valve embodying the invention and shows still another form of valve closure means.

Referring to FIG. 1 of the drawings, the valve 10 is of the regulator or poppet relief type and comprises a valve body 11 having stepped bore portions 12 and 13 connected by a conical shoulder or closure seat 14. The smaller inlet bore portion 12 of the valve 10 communicates with a pressure source, not shown, through conduit 15 which is secured to the valve body 11 by a suitable inlet fitting 16. The larger outlet bore portion 13 is placed in communication with a sump, not shown, or other suitable fluid receiver through the conduit 17 connected to the outlet line 18 by means of a suitable outlet fitting 19.

The valve closure member 20 comprises a metal ball disposed in the larger bore 13 and is normally biased against the conical closure seat 14 by the driver 21 having a generally flat leading face 22 in contact with the ball 20. As shown in FIG. 1 the driver 21 is slidably disposed in the bore 13 and has a generally square cross-section providing ample fluid flow clearance between the respective walls of the driver and the bore wall. The driver 21 is biased into contact with the closure ball 20 by a pair of compression coil springs 23 and 24 disposed in the bore 13 between the driver and an adjustment screw 25 which is threadedly engaged within the bore. The biasing force of springs 23 and 24 may be varied by the screw 25 to set the desired blow-off pressure for the valve 10. The end of bore 13 outwardly from the adjustment screw 25 may be closed by an end cap 26.

The valve 10 further includes a relatively hard resilient ball 27 disposed in the bore 12 ahead of the closure seat 14. The resilient ball 27 serves as a sealing member and is slightly oversized with respect to the bore 12 so as to provide an initial sealing engagement with the bore wall.

Figure 7:
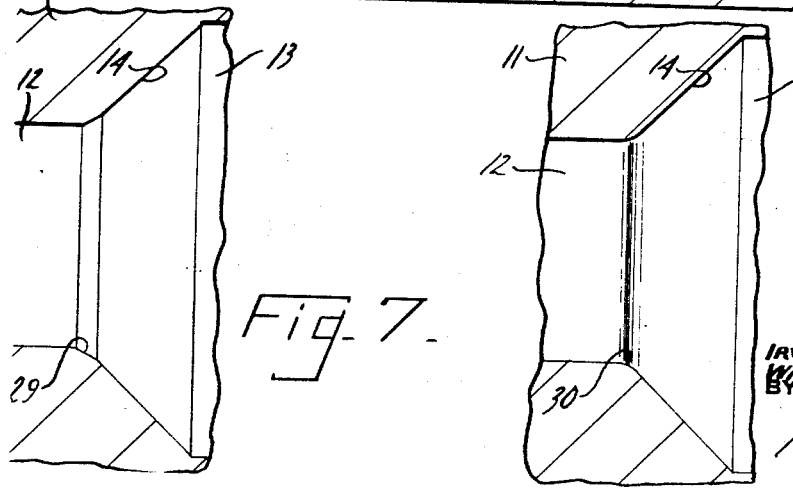
FIG. 7 is an enlarged detail view showing the valve closure seat.
Figure 8:
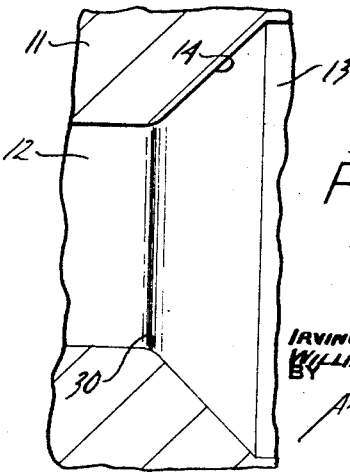
FIG. 8 is a view similar to that of FIG. 7 and shows an alternative closure seat construction for the valve.

By way of example a particular valve designed for 1,000 pounds per square inch blow-off pressure included a ½ inch diameter steel closure ball disposed in a ⅝ inch diameter bore. The closure ball was biased against a conical seat which was tapered at 45° with respect to the bore axis and opened into a smaller bore of .370 inch diameter. A rubber ball of .375 inch diameter and of 90 durometer hardness was disposed in the smaller bore. The valve body was of die cast construction and the only subsequent machine operation was at the edge or juncture 28 between the seat 14 and the smaller bore 12 where a chamfer 29 was provided as generally shown in FIG. 7. The sharpness of the edge or juncture 28 can also be reduced by a round of suitable radius as shown at 30 in FIG. 8 with equally good results.

In service, the oversize characteristics of the resilient ball 27 provides initial sealing contact with the wall of bore 12 as herinbefore described. Under the influence of inlet pressures of a lesser magnitude than blow-off pressure, the resilient ball 27 is pushed against the closure ball 20 and deformed to exert sealing force radially commensurate with the inlet pressures, giving rise to the leakproof character of the valve. Thus, even if the closure ball 20 is not properly seated due to entrapment of foreign matter between the closure ball and its seat 14, the fluid pressure deformed resilient ball 27 will prevent passage of fluid through the valve at pressures beneath blow-off pressure.

When the blow-off pressure is exceeded and the closure ball 20 is pushed from its seat 14, flow proceeds past the resilient ball 27 which is deformed under the pressure so that a major portion thereof moves from smaller bore 12 into the larger bore 13 remains in frictional engagement with the closure ball as generally shown in FIG. 2. As there shown, the blow-off pressure causes the resilient ball 27 to deform eccentrically with respect to seat 14 and this deforming movement of the resilient ball generally forces the closure ball to move along the face 22 of driver 21 to a cocked or off-centered position. Upon dissipation or removal of the blow-off pressure, the deformed resilient ball 27 returns to its normal configuration in bore 12 and the closure ball 20 to its seat 14 as generally shown in FIG. 1. The valve 10 may be generally characterized as quick or snap-acting. In view of the sealing characteristics of the resilient ball 27 within the bore 12, pressures near blow-off will not cause leakage or premature blow-off and the valve 10 will open at a generally uniform regulated or relief pressure.

The regulator or poppet relief valve 31 of FIG. 3 differs basically from the valve 10 hereinbefore described with respect to the valve closure member and its seat. The member 32 is a combined driver and closure member having a flat closure face 33 which is biased against a right angle or square shoulder seat 34 by the spring 35. The member 32 is of generally circular cross-section having a diameter somewhat less than the diameter of bore 13. The closure face 33 of member 32 is provided with a conical depression 36 generally centrally thereof placing the depression in general alignment with the smaller bore 12. The edge or junction 37 between the smaller bore 12 and seat 34 is chamfered or rounded similarly as the edge or junction 28 of valve 10 to minimize wear on the resilient ball 27.

Under the influence of pressure of a lesser magnitude than blow-off pressure, the resilient ball 27 of valve 31 functions similarly as described with respect to valve 10. Under blow-off pressure conditions, the resilient ball 27 of valve 31 is at least in part deformed into the conical depression 36 of member 32 to positionally control the ball as a major portion thereof is forced out of the bore 12. The resilient ball 27 and closure member 32 resume their position generally shown in FIG. 3 when the blow-off pressure is dissipated or removed.

The operation of the regulator or poppet relief valve 38 of FIG. 4 is generally similar to that of valve 31 of FIG. 3. The valve 38 differs structurally from valve 31 in that a conical seat 39 similar to seat 14 of valve 10 connects the bores 12 and 13, and the combined driver and closure member 40 is provided with a conical surface 41 for engagement with the seat 39.

Figure 5:
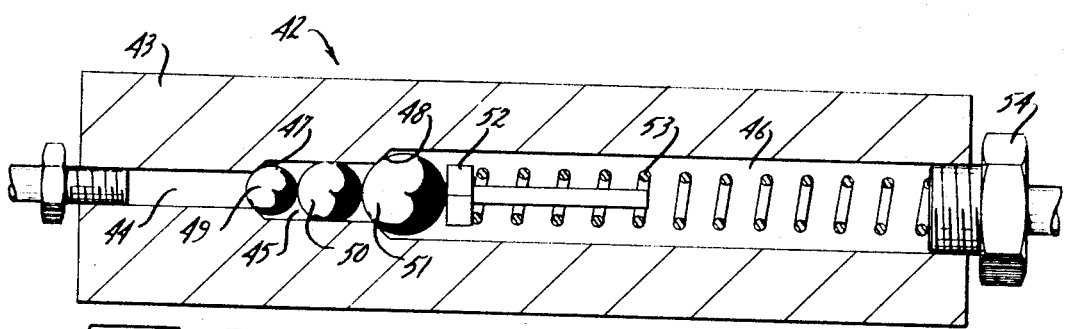
FIG. 5 is a sectional view of a regulator and check valve which embodies the invention.
Figure 6:
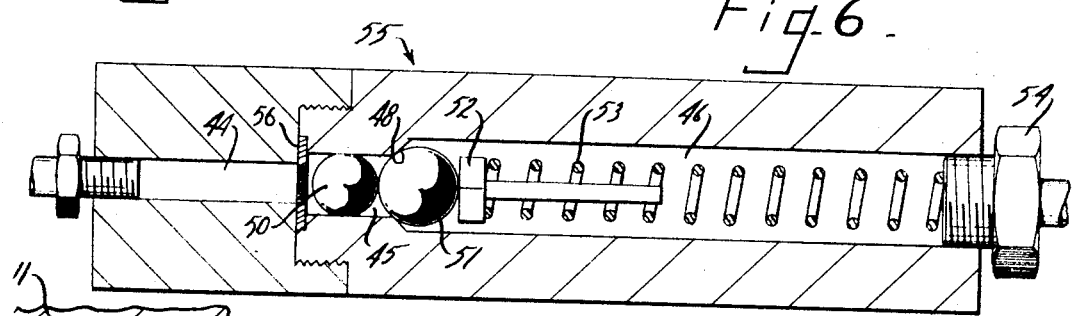
FIG. 6 is a sectional view showing the invention as employed in another form of regulator and check valve.

According to FIGS. 5 and 6 the invention is shown as embodied in a regulator and unidirectional check valve structure. The valve 42 of FIG. 5 comprises a valve body 43 having an inlet bore portion 44, an intermediate bore portion 45 and an outlet bore portion 46. The intermediate bore 45 is diametrically larger than the inlet bore 44 and is connected thereto by the conical valve seat 47. The outlet bore 46 is diametrically larger than the intermediate bore 45 and is connected thereto by a conical valve seat 48. A loose metal ball 49 is disposed in the intermediate bore 45 and is adapted to engage with the valve seat 47. A resilient ball 50 similar to the ball 27 of FIGS. 1–4 is also disposed in the intermediate bore 45 and is slightly oversized with respect to its bore to provide initial sealing engagement. A metal ball 51 is disposed in the larger outlet bore 46 and is biased against the valve seat 48 by the driver 52. If desired, oversizing of the resilient ball 50 may be obtained by so spacing the valve seats 47 and 48 that the metal balls 49 and 51 effect an axial compression of the resilient ball to deforme the latter radially into sealing engagement with its bore wall.

Flow through the valve 42 of FIG. 5 takes place when the fluid pressure in the inlet bore 44 exceeds the biasing force of spring 53 disposed between the driver 52 and the outlet fitting 54. For normal flow through valve 42 the coaction between the resilient ball 50 and the biased metal ball 51 is similar to that described for the comparable balls 27 and 20 of valve 10 of FIGS. 1 and 2. During normal flow the loose metal ball 49 in the intermediate bore 45 has only minor effect with respect to deformation of the resilient ball 50. If for any reason the flow through the valve 42 is reversed and the metal closure ball 51 not properly seated, such reverse flow is nevertheless instantly checked as the back pressure forces the resilient ball 50 against the seated smaller ball 49 in the intermediate bore 45 and the resulting deformation of the resilient ball seals the bore against flow and even leakage.

In the regulator check valve 55 of FIG. 6 a gate or apertured closure plate 56 has replaced the metal ball 49 and its seat 47 as were provided in the valve 42 of FIG. 5. For normal flow the valve 55 of FIG. 6 operates substantially like that of valve 42 of FIG. 5. If for any reason flow is reversed in the valve 55 the resilient ball 50 is forced against the apertured plate 56 and deformed into leakproof sealing engagement with the wall of bore 45.

We claim:

1. In a valve unit having stepped inlet and outlet bore portions with said inlet bore portion being of smaller cross section than said outlet bore portion, a closure seat located between said bore portions, a movable closure member disposed in said outlet bore portion, means for biasing said member against said seat, and a resilient ball disposed within said inlet bore portion, said resilient ball being oversize with respect to said inlet bore portion to provide for initial sealing contact with the wall thereof, said means for biasing said closure member against said seat tending to hold said resilient ball in said inlet bore portion, and under the influence of inlet pressures of a lesser magnitude than blow-off pressure said resilient ball being forced against the closure member and deformed to exert a sealing force radially commensurate with the inlet pressures, and at blow-off pressure at least some portion of said resilient ball being forced into said outlet bore portion unseating said closure member and permitting fluid communication between said inlet and outlet bore portions.

2. The invention as set forth in claim 1 wherein a flow through barrier is disposed in the inlet bore portion ahead of said resilient ball, and reverse flow through the valve is checked as the resilient ball is forced against the barrier and deformed by the back pressure to exert a sealing force radially on the bore wall.

3. The invention as set forth in claim 2 wherein the flow through barrier comprises a valve seat and a loose ball adapted to engage with said valve seat, said loose ball being normally removed from its valve seat to pass fluid under the influence of inlet pressures and adapted to engage with the seat under reverse flow conditions, with the resilient ball being forced against the loose ball and deformed by the back pressure to seal its bore.

4. The invention as set forth in claim 2 wherein the flow through barrier comprises an apertured plate which normally passes fluid under the influence of inlet pressures, said resilient ball under reverse flow conditions being forced against said plate and deformed by the back pressure to seal said inlet bore.

5. The invention as set forth in claim 1 wherein the closure seat is conical and the closure member is a metal ball.

6. The invention as set forth in claim 1 wherein the closure seat comprises a right angle shoulder and the closure member has a flat closure face engageable with the right angle shoulder seat.

7. The invention as set forth in claim 6 wherein the closure face of the closure member is provided with a depression generally centrally thereof and in alignment with the inlet bore, said depression serving to positionally control the resilient ball when the closure member is unseated in response to blow-off pressure and a major portion of the resilient ball is forced out of the inlet bore.

8. The invention as set forth in claim 1 wherein the closure seat is conical and the closure member has a correspondingly conical surface engageable with said seat, and wherein the closure member has a flat leading face provided with a depression generally centrally thereof and in alignment with the inlet bore, said depression serving to positionally control the resilient ball when the closure member is forced from its seat in response to blow-off pressure and a major portion of the resilient ball is forced out of the inlet bore.

References Cited

UNITED STATES PATENTS

| | | |
|---|---|---|
| 143,294 | 9/1873 | Mendham. |
| 434,823 | 8/1890 | Farley. |
| 2,545,000 | 3/1951 | Martin _____ 251—175 X |
| 2,664,266 | 12/1953 | Johnson _____ 251—191 X |
| 2,896,664 | 7/1959 | Lieser _____ 137—596.2 |
| 3,077,204 | 2/1963 | Bennett et al. _____ 137—525 |
| 3,292,897 | 12/1966 | McClelland _____ 251—175 |

CLARENCE R. GORDON, *Primary Examiner.*

DAVID J. ZOBKIW, *Assistant Examiner.*

U.S. Cl. X.R.

137—525, 539.5; 251—175, 191

UNITED STATES PATENT OFFICE
CERTIFICATE OF CORRECTION

Patent No. 3,447,564                          June 3, 1969

Irving W. North et al.

It is certified that error appears in the above identified patent and that said Letters Patent are hereby corrected as shown below:

Column 2, line 72, after "13" insert -- and --. Column 3, line 27, "junction" should read -- juncture --; line 29, "junction" should read -- juncture --.

Signed and sealed this 23rd day of June 1970.

(SEAL)
Attest:

Edward M. Fletcher, Jr.                    WILLIAM E. SCHUYLER, JR.
Attesting Officer                            Commissioner of Patents